United States Patent
Stiatti et al.

(10) Patent No.: US 12,031,516 B2
(45) Date of Patent: Jul. 9, 2024

(54) ELECTRIC POWER SUPPLY KIT FOR AN IRRIGATION SYSTEM FOR LAND

(71) Applicants: Anna Stiatti, Milan (IT); Alberto Stiatti, Milan (IT); Matteo Maria Stiatti, Duno (IT)

(72) Inventors: Anna Stiatti, Milan (IT); Alberto Stiatti, Milan (IT); Matteo Maria Stiatti, Duno (IT); Marc Capilla Manzano, Palafrugell Girona (ES)

(73) Assignees: Anna Stiatti, Milan (IT); Alberto Stiatti, Milan (IT); Matteo Maria Stiatti, Duno (IT)

( * ) Notice: Subject to any disclaimer, the term of this patent is extended or adjusted under 35 U.S.C. 154(b) by 555 days.

(21) Appl. No.: 17/292,499

(22) PCT Filed: Dec. 6, 2019

(86) PCT No.: PCT/IB2019/060518
§ 371 (c)(1),
(2) Date: May 10, 2021

(87) PCT Pub. No.: WO2020/121141
PCT Pub. Date: Jun. 18, 2020

(65) Prior Publication Data
US 2022/0018324 A1    Jan. 20, 2022

(30) Foreign Application Priority Data
Dec. 10, 2018   (IT) .................. 102018000010917

(51) Int. Cl.
*F03B 13/10*    (2006.01)
*A01G 25/16*   (2006.01)
(Continued)

(52) U.S. Cl.
CPC .............. *F03B 13/10* (2013.01); *A01G 25/16* (2013.01); *B05B 12/087* (2013.01);
(Continued)

(58) Field of Classification Search
CPC ....... A01G 25/16; F03B 13/10; B05B 12/087; H02K 7/1823; H02K 11/0094; H02K 11/04; E03C 1/055
See application file for complete search history.

(56) References Cited

U.S. PATENT DOCUMENTS 4,488,055 A * 12/1984 Toyama .................. F03B 13/08
                                                                  416/185
4,731,545 A *  3/1988 Lerner .................... F03B 13/04
                                                                  416/185
(Continued)

FOREIGN PATENT DOCUMENTS

DE    102005054868 A1    5/2007
WO    WO-2004033898 A1    4/2004
(Continued)

OTHER PUBLICATIONS

International Search Report issued Feb. 13, 2020 in PCT/IB2019/060518, 5 pages.
(Continued)

*Primary Examiner* — Christopher R Dandridge
(74) *Attorney, Agent, or Firm* — Element IP, PLC

(57) ABSTRACT

Electric power supply kit (10) for an irrigation system (100) for land, said irrigation system (100) comprising at least one conduit (110, 111) adapted for the passage of an irrigation fluid and at least one electrical device (120) comprising at least one rechargeable power supply battery (130), said electric power supply kit (10) comprising at least one hydroelectric turbine (20) in fluid communication with said irrigation fluid adapted to generate an alternating electric
(Continued)

current voltage as said irrigation fluid passes into said at least one conduit (110, 111), at least one voltage regulator (30) adapted to be powered with said alternating electric current, adapted to stabilize said alternating electric current voltage in a direct electric current voltage, and adapted to supply said at least one power supply battery (130) of said at least one electrical device (120) with said direct electric current voltage.

13 Claims, 8 Drawing Sheets

(51) Int. Cl.
*B05B 12/08* (2006.01)
*H02K 7/18* (2006.01)
*H02K 11/00* (2016.01)
*H02K 11/04* (2016.01)

(52) U.S. Cl.
CPC ....... *H02K 7/1823* (2013.01); *H02K 11/0094* (2013.01); *H02K 11/04* (2013.01)

(56) References Cited

U.S. PATENT DOCUMENTS

| 5,947,678 | A | * | 9/1999 | Bergstein | F03B 17/061 415/203 |
| 2008/0136191 | A1 | * | 6/2008 | Baarman | F03B 3/04 290/54 |
| 2008/0251602 | A1 | | 10/2008 | Leggett et al. | |

FOREIGN PATENT DOCUMENTS

WO  WO-2010020764 A1 *  2/2010  ............ A01G 25/00
WO  WO-2017203530 A1    11/2017

OTHER PUBLICATIONS

Written Opinion issued Feb. 13, 2020 in PCT/IB2019/060518, 6 pages.

\* cited by examiner

ELECTRIC POWER SUPPLY KIT FOR AN IRRIGATION SYSTEM FOR LAND

The present invention relates to an electric power supply kit for an irrigation system for land.

In the prior art, electric power supply kits for irrigation systems comprising batteries or charging cells for electrical devices are known.

Disadvantageously the electrical devices of the irrigation system are not energetically autonomous since the battery or the cell must be recharged or replaced by disconnecting the electrical device from the irrigation system and/or extracting the electrical device from the land.

Disadvantageously known electric power supply kits for an irrigation system for land do not allow to be sufficiently efficient to develop a voltage so as to operate the electrical devices of the irrigation system autonomously.

The object of the present invention is to provide an electric power supply kit to make an irrigation system for land energetically autonomous.

According to the invention, such object is achieved with an electric power supply kit according to claim 1.

Another object of the present invention is to provide an irrigation system for land energetically autonomous.

According to the invention, such further object is achieved with an irrigation system according to claim 8.

Other features are provided for in the dependent claims.

The features and advantages of the present invention will result more evident from the following description, which is to be understood as exemplifying and not limiting, with reference to the appended schematic drawings, wherein:

FIG. 1 is a schematic view of an irrigation system for land according to the present invention comprising a conduit adapted for the passage of an irrigation fluid engaged with a T-shaped fitting with an irrigator and with a hydroelectric turbine of an electric power supply kit which powers a voltage regulator of the kit electrically connected to electrical devices comprising a rechargeable power supply battery, where the hydroelectric turbine comprises a rotating element partially in fluid communication with said conduit;

Figure 6:
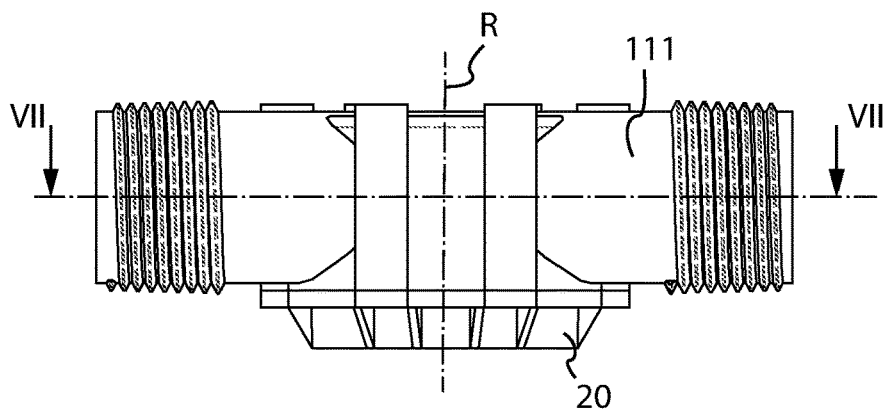
FIG. 6 is a side view of the turbine of FIG. 5.
Figure 7:
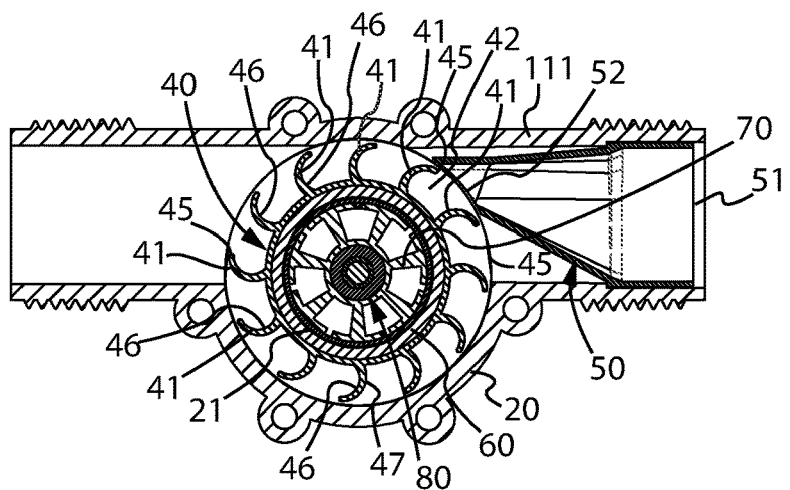
Figure 12:
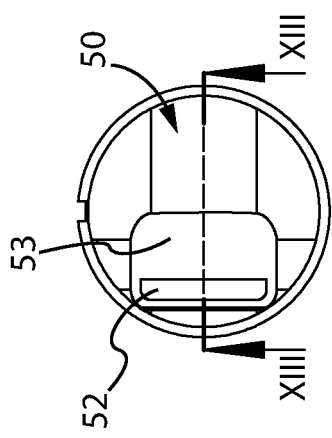
Figure 13:
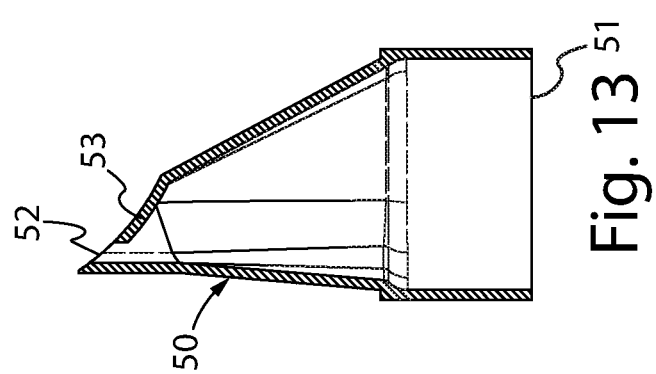
Figure 10:
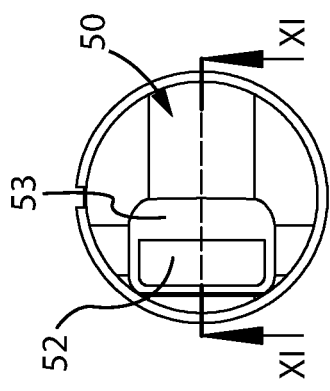
Figure 11:
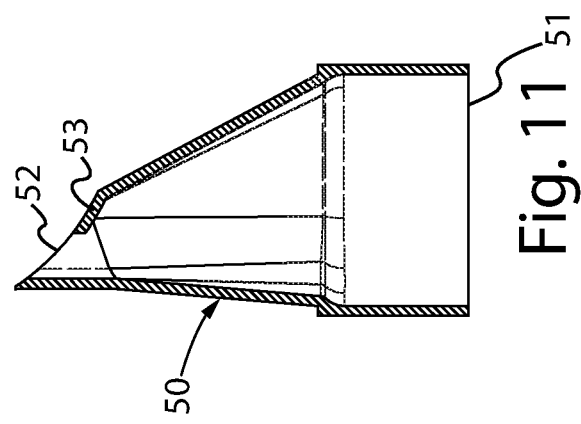
Figure 8:
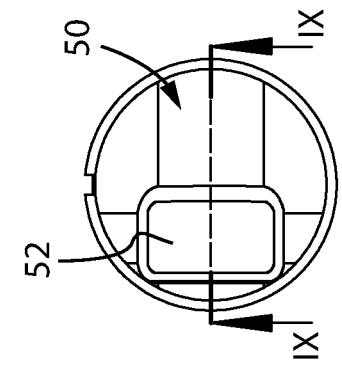
Figure 9:
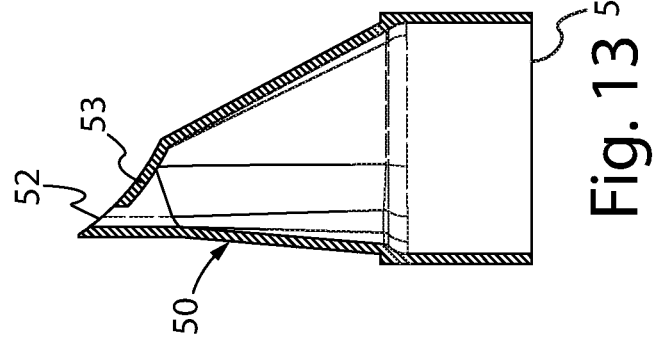
Figure 14:
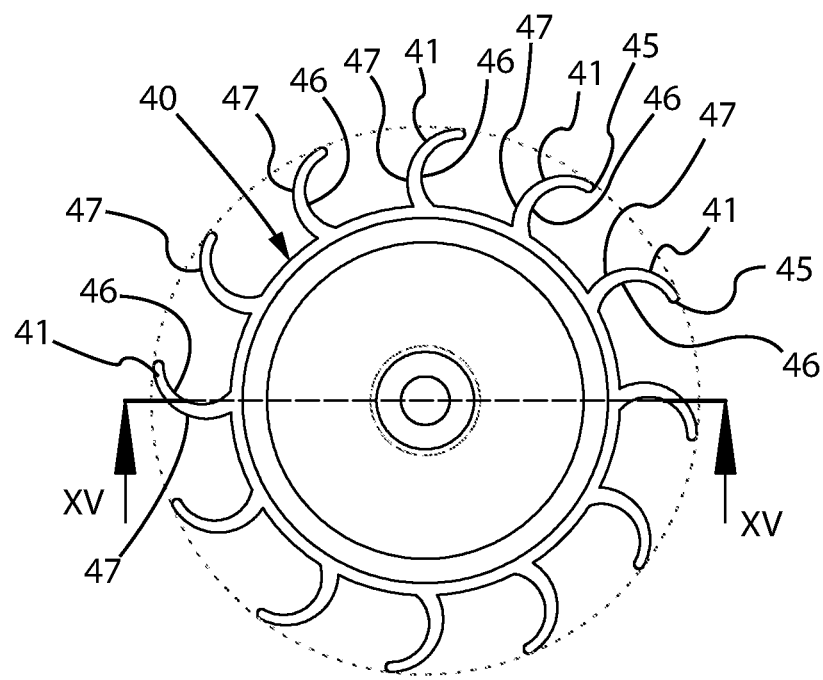
Figure 15:
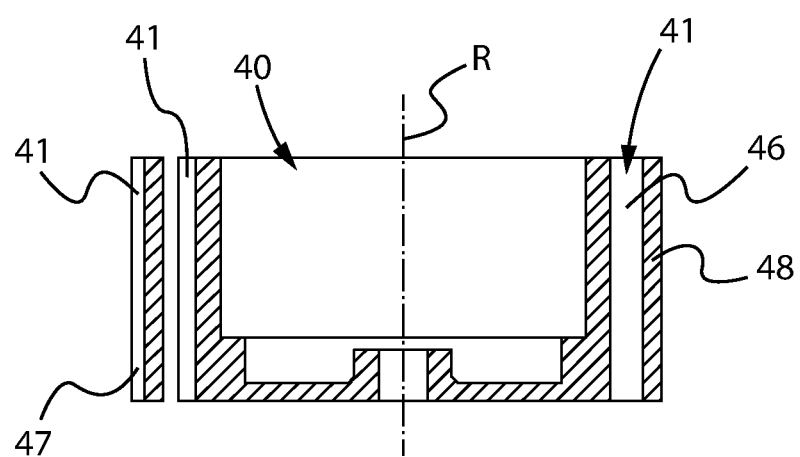
Figure 17:
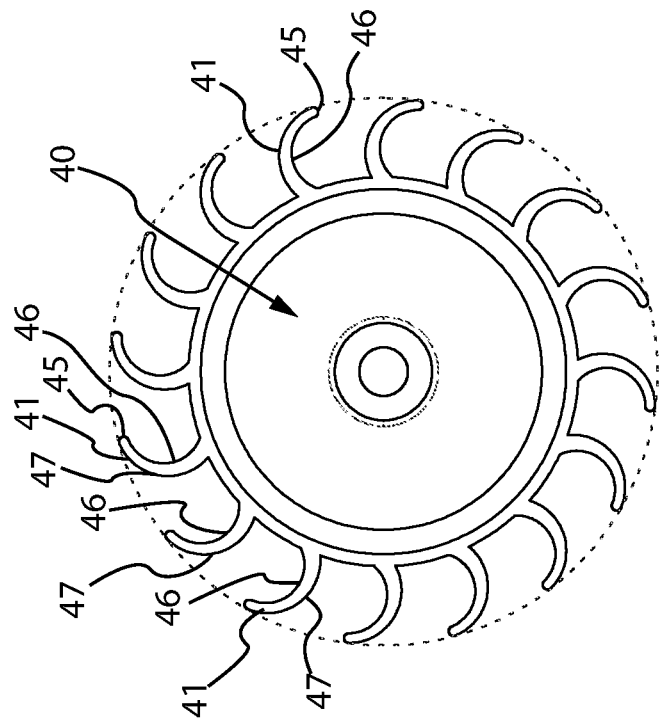
Figure 16:
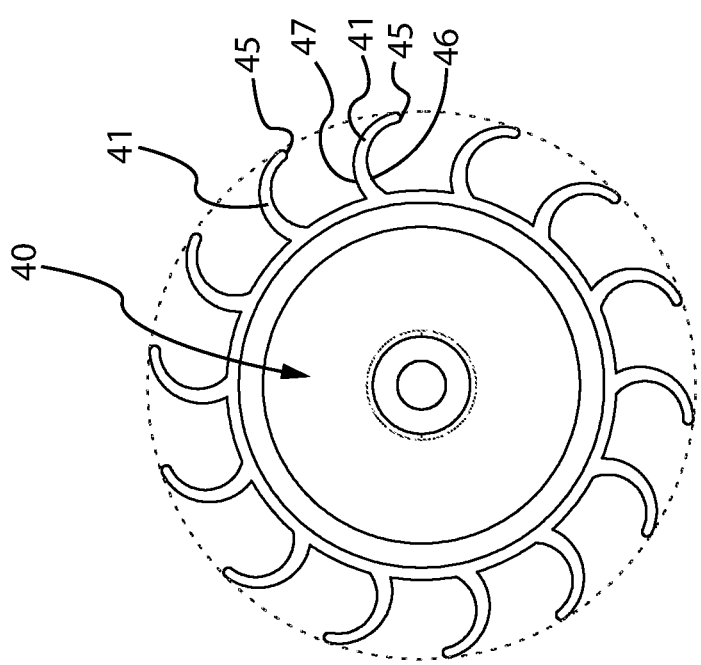

FIG. 7 is a sectional view according to line VII-VII of FIG. 6 and shows an inlet nozzle engaged inside the conduit towards the rotating element comprising a multiplicity of blades, in which the inlet nozzle is adapted to convey the fluid present in the conduit towards a portion of the rotating element comprised between two adjacent blades so that the rotating element is partially in communication with the fluid of the conduit;

FIG. 8 shows a front view of a first type of truncated-conical nozzle comprising a completely open outlet through opening;

FIG. 9 is a sectional view according to line IX-IX of FIG. 8;

FIG. 10 shows a front view of a second type of truncated-conical nozzle comprising a narrowed outlet through opening, in which the narrowed outlet through opening is open for a cross section 66% wide with respect to the completely open through opening;

FIG. 11 is a sectional view according to line XI-XI of FIG. 10;

FIG. 12 shows a front view of a third type of truncated-conical nozzle comprising an even more narrowed outlet through opening, in which the even more narrowed outlet through opening is open for a cross section 33% wide with respect to the completely open outlet through opening;

FIG. 13 shows a sectional view according to line XIII-XIII of FIG. 12;

FIG. 14 shows a view from above of the rotating element comprising twelve blades;

FIG. 15 shows a section of the rotating element according to line XV-XV of FIG. 14;

FIG. 16 shows a view from above of a rotating element according to a first alternative embodiment comprising fourteen blades;

FIG. 17 shows a view from above of a rotating element according to a second alternative embodiment comprising sixteen blades.

With reference to the aforementioned figures, an irrigation system 100 for land comprising a multiplicity of conduits 110 adapted for the passage of an irrigation fluid is shown. The irrigation fluid is water. FIGS. 1-4 show a portion of a conduit 110 of said multiplicity of conduits 110.

The irrigation system 100 comprises a multiplicity of electrical devices 120, each of which comprises a rechargeable power supply battery 130.

Figure 1:
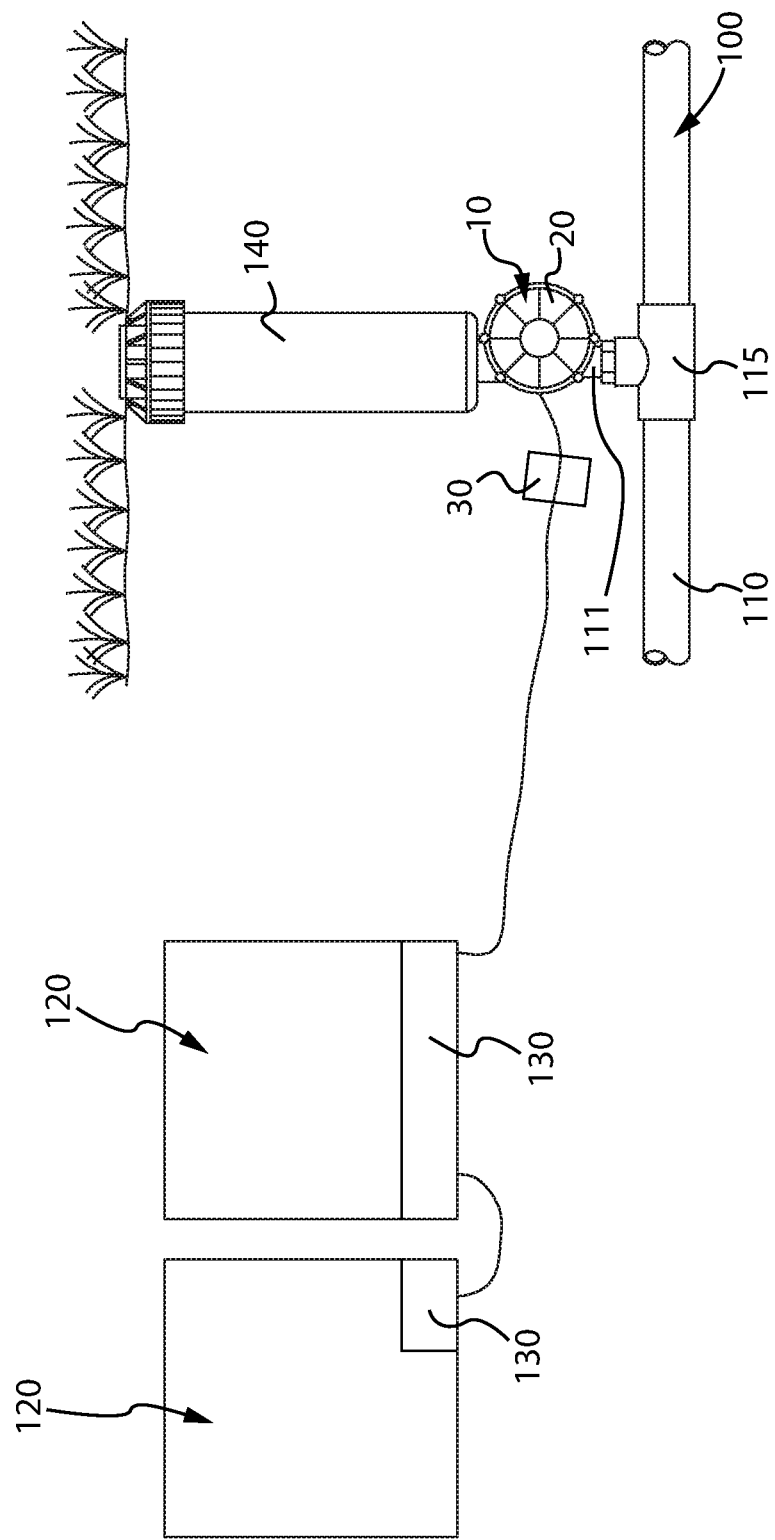
Figure 3:
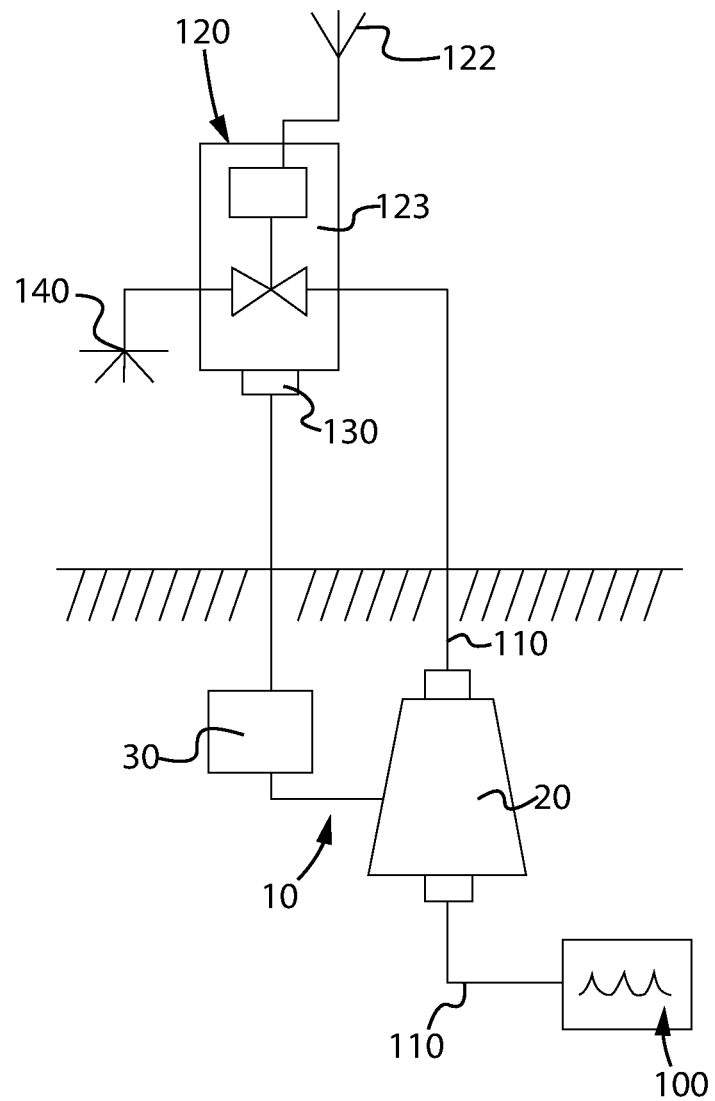
FIG. 3 is a schematic view of the irrigation system according to the present invention where the electrical device comprises a solenoid valve, the communication antenna and a drip irrigator.
Figure 4:
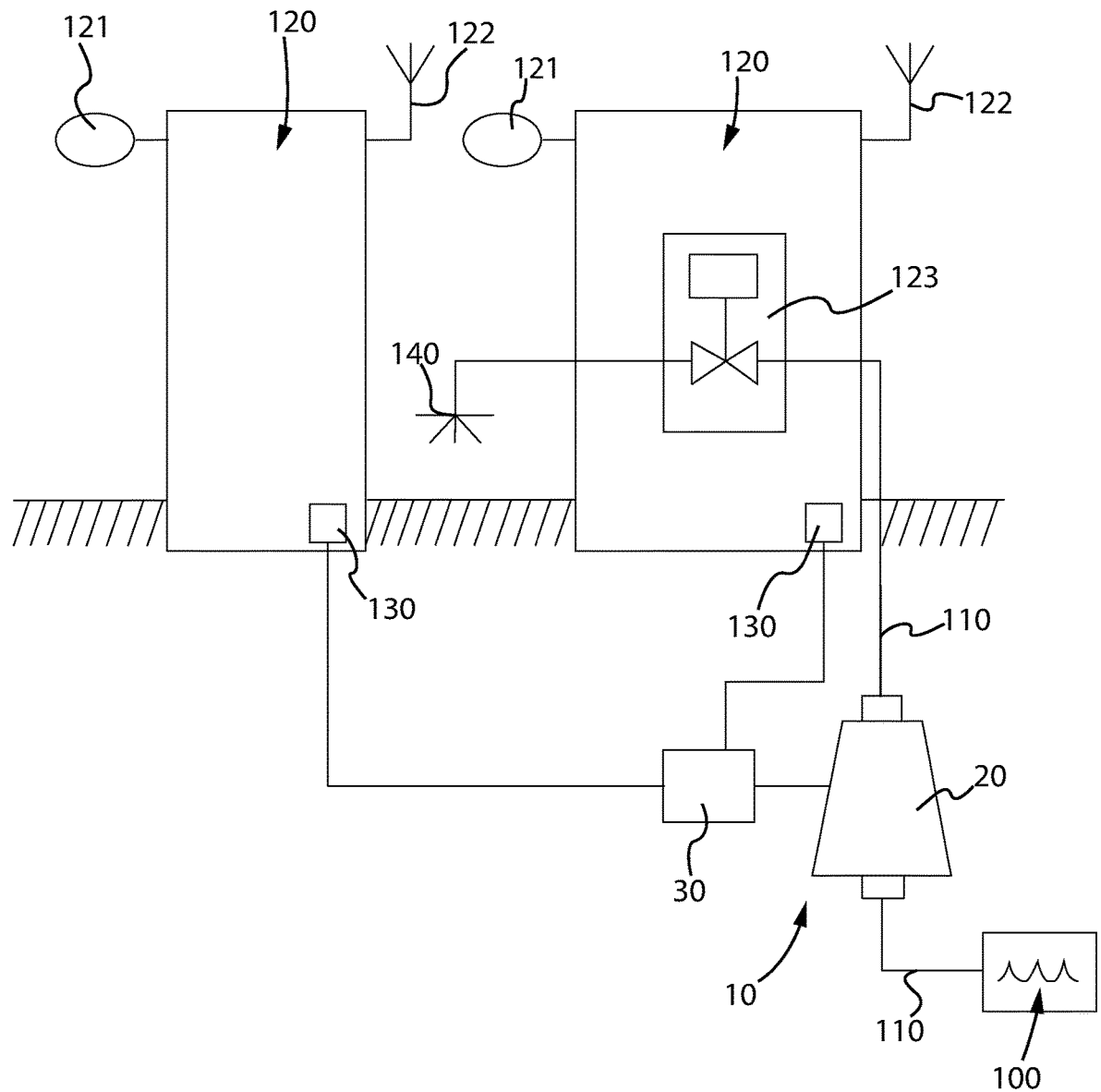
FIG. 4 is a schematic view of the irrigation system according to the present invention where the hydroelectric turbine is electrically connected to the batteries of two electrical devices, the first of which comprises a solenoid valve, a sensor, the communication antenna and a drip irrigator and a second of which comprises a sensor and another communication antenna.

FIGS. 1 and 4 show two electrical devices 120, while FIGS. 3 and 4 show only one. The electrical device 120 can also comprise more than one rechargeable battery 130.

The irrigation system also comprises an electric power supply kit 10 which comprises a hydroelectric turbine 20 in fluid communication with said irrigation fluid. The hydroelectric turbine 20 is mounted with a first conduit 111 of the multiplicity of conduits 110. The hydroelectric turbine 20 generates an alternating electric current voltage as the irrigation fluid passes into the first conduit 111 where the hydroelectric turbine 20 is mounted.

The hydroelectric turbine 20 comprises a rotating element 40 comprising a multiplicity of blades 41 as shown in FIGS. 7, 14-17.

It is envisaged that the rotating element 40 comprises twelve blades as shown in FIGS. 7, 14 and 15, or alternatively fourteen blades as shown in FIG. 16 or alternatively sixteen blades as shown in FIG. 17.

Advantageously, a greater number of blades 41 allows the rotation to be improved even at low flow rates of fluid in the first conduit 111.

The hydroelectric turbine 20 is mounted with the first conduit 111 as shown in FIGS. 1, 5-7, where only a portion of the rotating element 40 is in fluid communication with the first conduit 111.

As shown in particular in FIG. 7, the electric power supply kit 20 comprises an inlet nozzle 50 which is engaged inside the first conduit 111 upstream of the rotating element 40. The inlet nozzle 50 is adapted to convey the fluid present at the inlet of the first conduit 111 towards a portion of the rotating element 40 comprised between two adjacent blades 41 so that the rotating element 40 is partially in communication with the fluid of the first conduit 111.

As shown in particular in FIGS. 7-13, the inlet nozzle 50 has a truncated-conical shape and comprises an inlet through opening 51 and an outlet through opening 52. The transverse dimensions of the inlet through opening 51 are substantially equal to an internal cross section of the first conduit 111. Substantially equal means that the difference between the transverse dimension of the inlet through opening 51 and the internal cross section of the first conduit 111 is less than a thickness of the walls of the nozzle 50 which is mounted inside walls of the first conduit 111. As shown in FIGS. 7, 9, 11 and 13, the transverse dimensions of the through openings 51, 52 of the nozzle 50 are measured on a transverse plane lying on a geometric plane perpendicular to a rotation axis R of the rotating element 40.

As shown in FIGS. 7-9, the transverse dimensions of the outlet through opening 52 of the nozzle are substantially equal to an angular distance between two adjacent blades 41 of the rotating element 40. The angular distance between two adjacent blades 41 is measured on an arc of a geometric circumference passing through ends 45 of the blades 41, in which the geometric circumference comprising the arc comprises a geometric centre that is geometrically coincident with a geometric centre of the rotating element 40.

As shown in FIG. 7, a space 42 between two adjacent blades 41 of the rotating element 40 is delimited by an outer wall of the rotating element 40 and by the two adjacent blades 41 extending radially from the outer wall of the rotating element 40 to the outside.

As shown in FIGS. 7, 9, 11 and 13, the truncated-conical shape of the nozzle 50 is truncated downstream by a geometrical curve that forms the outlet through opening 52, in which the geometric curve comprises a cross section that follows the profile of the geometric circumference passing through the ends 45 of the blades 41 so as to direct a greater quantity of fluid into the space 42.

As shown in FIGS. 7, 14, 16, 17 the blades 41 of the rotating element 40 comprise a cross section comprising a curvilinear portion comprising a concave portion 46 directed to a direction opposite to a direction of rotation of the rotating element 40 around said rotation axis R. The cross section of the rotating element 40 lies on the geometric plane perpendicular to the rotation axis R of the rotating element 40.

Advantageously, the concave portion 46 of each blade 41 of the rotating element 40 allows to better channel the fluid coming from the nozzle 50 allowing a greater rotation thrust in the direction of rotation of the rotating element 40 due to a fluid-dynamic circulation of the fluid, in which the circulation is the value of the circulation of a speed field of a fluid along a closed loop, i.e. the circulation of speed.

As shown in FIGS. 7, 14, 16, 17 the curvilinear portion of each blade 41 comprising a convex portion 47 directed to the same direction as the direction of rotation of the rotating element 40 around the rotation axis R.

Advantageously, the convex portion 47 of each blade 41 of the rotating element 40 allows the fluid coming from the nozzle 50 to be better channelled, allowing a fluid-dynamic resistance to be reduced due to a fluid-dynamic circulation of the fluid. Moreover, the convex portion 47 of each blade 41 allows the fluid to be pushed towards an outlet of the first conduit 111. Still more advantageously, in order to increase the fluid speed against the blades 41 and to increase the fluid-dynamic circulation, alternative nozzles 50 comprising alternative outlet through openings 52 are provided which are partially blocked as shown in FIGS. 10-13.

In FIGS. 10-13 the nozzle 50 comprises a curvilinear blockage portion 53 which blocks at least one portion of the cross section of the outlet through opening 52 of the nozzle 50 so as to narrow the opening of the outlet through opening 52 of the nozzle 50. In these alternative embodiments, the transverse dimensions of the outlet through opening 52 of the nozzle 50 are less than an angular distance between two adjacent blades 41 of the rotating element 40.

FIGS. 10 and 11 show an alternative nozzle 50 of the second type comprising a narrowed outlet through opening 52, in which the narrowed outlet through opening 52 is open for a cross section 66% wide with respect to the completely open outlet through opening 52 like the one shown in FIGS. 7-9.

FIGS. 12 and 13 show an alternative nozzle 50 of the third type comprising an even more narrowed outlet through opening 52, in which the even more narrowed outlet through opening 52 is open for a cross section 33% wide with respect to the completely open outlet through opening 52 like the one shown in FIGS. 7-9.

As shown in FIGS. 10-13, it should be noted that the narrowed through openings 52 of the alternative nozzles 50 are narrowed only in their transverse dimension. In fact, the axial dimension of the narrowed through opening 52 of FIGS. 10-13 remains the same as the through opening 52 according to FIGS. 7-9 since the axial dimensions depend on the height 48 of the blades 41 of the rotating element 40 where the height 48 of the blades 41 is shown in FIG. 15. The height 48 of the blades 41 and the other axial dimensions are measured along a geometric axis parallel to the rotation axis R of the rotating element 40.

Advantageously, the axial dimension of the outlet through opening 52 of the nozzle 50 corresponds to the height 48 of the blades 41 so as to better fill the space 42, allowing a greater rotating thrust of the rotating element 40 to be obtained. Corresponds means that the axial dimension of the outlet through opening 52 of the nozzle 50 is substantially equal to the height 48 of the blades 41 or slightly lower, in which slightly lower means less than the walls of the truncated-conical geometric shape of the nozzle 50.

Figure 5:
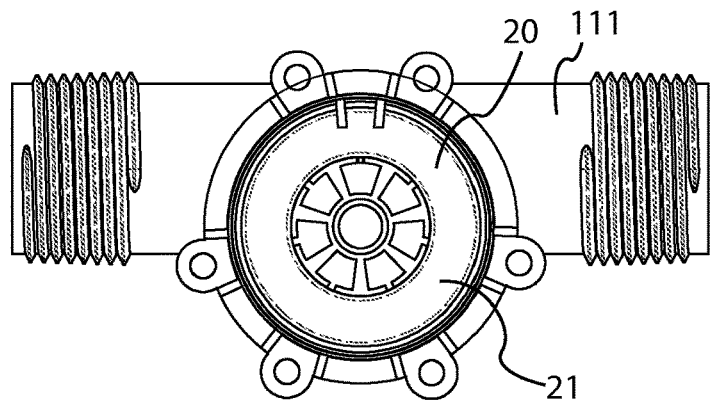
FIG. 5 is a view from above of the hydroelectric turbine which comprises the rotating element partially in fluid communication with the conduit.

As shown in FIGS. 5 and 7, the hydroelectric turbine 20 comprises a circular magnet 60 arranged inside the rotating element 40 and a coil 70 arranged inside the circular magnet 60. A vertical wall of a cover 21 of the hydroelectric turbine 20 is arranged between the coil 70 and the circular magnet 60. The hydroelectric turbine 20 comprises rotation bearings 80 arranged around the geometric rotation axis R.

The electric power supply kit 10 comprises a voltage regulator 30 which is powered with the alternating electric current generated by the hydroelectric turbine 20. The voltage regulator 30 stabilizes the alternating electric current voltage in a direct electric current voltage, and supplies the at least one power supply battery 130 of the at least one electrical device 120 with the direct electric current voltage. The direct current voltage of the battery 130 supplies the electrical elements of the electrical device 120.

As shown in FIG. 1, the first conduit 111 where the hydroelectric turbine 20 is engaged is engaged with one of the conduits 110 of the irrigation system 100 by means of a T-shaped fitting 115 which is engaged in fluid communication with the first conduit 111 and with the hydroelectric turbine 20.

Figure 2:
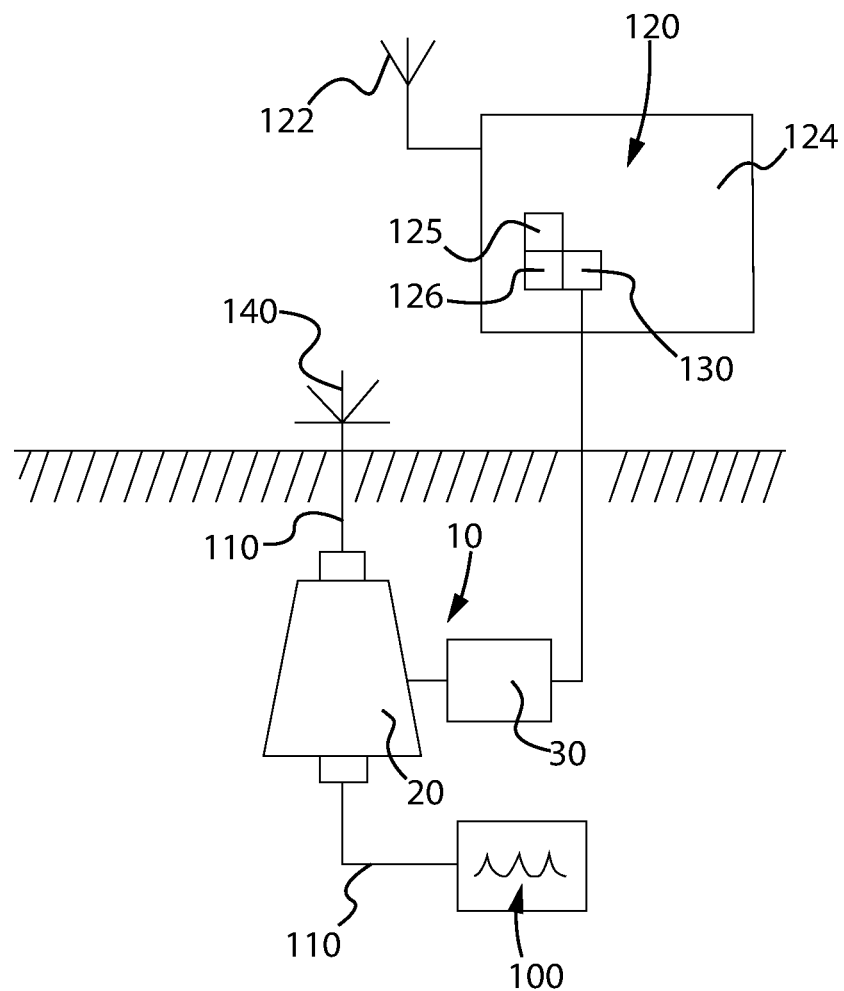
FIG. 2 is a schematic view of the irrigation system according to the present invention where the electrical device is a control unit of the system which comprises a processor, a memory and a communication antenna.

As shown in FIGS. 1-4, the irrigation system 100 comprises at least one irrigation fluid dispenser 140 such as, for example, an irrigator 140 shown in FIGS. 1 and 2 or a drip irrigator 140 shown in FIG. 3 or 4.

As shown in FIGS. 1-4, the hydroelectric turbine 20 is mounted in fluid communication with the at least one irrigation fluid dispenser 140.

The at least one electrical device 120 powered by the at least one rechargeable power supply battery 130 comprises at least one of at least one solenoid valve 123, at least one sensor 121, at least one communication antenna 122, at least one electronic control unit 124 or at least one WI-FI or 3G or radio router.

As shown in FIGS. 3 and 4, the at least one solenoid valve 123 is adapted to pass from at least an open position for allowing the passage of the irrigation fluid to at least one closed position for preventing the passage of the irrigation fluid which is directed from the irrigation system 100 towards the drip irrigator 140.

As shown in FIG. 4, at least one sensor 121 measures at least one environmental observable. FIG. 4 shows two electronic devices 120, the first comprising a first battery 130, a first sensor 121 a first communication antenna 122 and the second comprising a second battery 130, a second sensor 121, a second communication antenna 122 and a solenoid valve 123. As shown in FIGS. 2-4 the electrical devices 120 comprise communication antennas 122, each of which transmits a WI-FI or 3G or radio communication signal.

As shown in FIG. 2, the electronic device 120 comprises an electronic control unit 124 comprising a processor 125 and a memory 126, where said at least one processor 125 controls at least one of said at least one solenoid valve 123, said at least one sensor 121, said at least one communication antenna 122.

The electronic control unit 124 can also be a WI-FI or 3G or radio router comprising at least one processor 125 which actuates said at least one communication antenna 122.

The hydroelectric turbine 20 is adapted to operate like a flow meter measuring a flow rate of irrigation fluid. The hydroelectric turbine 20 is connected in communication with at least one processor 125 of said irrigation system 100 which may be the processor 125 of the control unit 124 or another processor 125 mounted with another electrical device 120.

The datum of the flow rate of irrigation fluid is received by said at least one processor 125.

The datum of the flow rate of irrigation fluid can be sent by the processor 125 for example through the communication antenna 124 or through an electrical signal cable.

The at least one processor 125 monitors said flow rate and/or regulates said flow rate by actuating at least one solenoid valve 123, where said at least one solenoid valve 123 is adapted to pass from an open position for allowing the passage of said irrigation fluid to at least a partially open position for reducing the flow rate of irrigation fluid, to a closed position for preventing the passage of said irrigation fluid.

Advantageously, this allows the flow of the irrigation fluid to be monitored, signalling a malfunctioning of the irrigation system 100, for example a danger of lack of water or a flow rate threshold that is previously deemed to be dangerous or negative.

Advantageously, this allows the water consumption of the irrigation system 100 to be monitored remotely.

The at least one electronic device 120 is connected in communication with at least one processor 125 of said irrigation system 100. The at least one electronic device 120 sends to the at least one processor 125 a charge measurement of the at least one power supply battery 130 to which the at least one electronic device 120 is electrically connected. The at least one processor 125 controls the charge measurement and interrupts the charge of the at least one power supply battery 130 of the at least one electronic device 20 when the at least one power supply battery 130 is charged at least within a predetermined threshold. The predetermined threshold of the charge of the battery to be reached depends on the technical characteristics of the battery, which can be precharged in the memory 126 or introduced at a later time by an operator through the processor 125.

Alternatively, it is possible to provide that said irrigation system 100 comprises a single conduit 110 and the first conduit 111 is a portion of the conduit 110 only. The first conduit 111 fits said hydroelectric turbine 20 to generate electric current which powers at least one electrical device 120.

Alternatively, it is possible to provide that the irrigation system 100 comprises at least one electrical device 120.

Alternatively, the power supply kit 10 may not be part of the irrigation system 100 and may be provided separately. In said alternative said electric power supply kit 10 is adapted to be mounted with said irrigation system 100.

Alternatively, the electric power supply kit 10 comprises more than one hydroelectric turbine 20.

Alternatively, it is provided that the power supply kit 10 comprises a hydroelectric turbine 20 for each element electrically supplied 120 or not 140 of the irrigation system 100, for example that hydroelectric turbines 20 are mounted with each irrigator 140 and supply the electrical devices 120 of the irrigation system 100 with electric power.

Alternatively, a hydroelectric turbine 20 is provided for each electrical device 120.

Alternatively, a voltage regulator 30 is provided for each hydroelectric turbine 30.

Alternatively, as shown in FIGS. 2-4, the hydroelectric turbine 20 is directly engaged with the first conduit 111 without the need for the T-shaped fitting 115 of FIG. 1.

The invention thus conceived is susceptible to many modifications and variants, all falling within the same inventive concept; furthermore, all details can be replaced by technically equivalent elements. In practice, the materials used, as well as the dimensions thereof, can be of any type according to the technical requirements.

The invention claimed is:

1. An electric power supply kit adapted to be mounted with an irrigation system,
    said irrigation system comprising at least one conduit adapted for the passage of an irrigation fluid and at least one electrical device comprising at least one rechargeable power supply battery,
    said electric power supply kit comprising:
        at least one hydroelectric turbine in fluid communication with said irrigation fluid adapted to generate an alternating electric current voltage as said irrigation fluid passes into said at least one conduit, wherein said at least one hydroelectric turbine comprises a rotating element comprising a multiplicity of blades, wherein said at least one conduit is a tube comprising an inlet and an outlet on a same direction and having a same diameter, the inlet being upstream with respect to the turbine and the outlet being downstream with respect to the turbine, and wherein said rotating element is a hub;
        at least one voltage regulator adapted to be powered with said alternating electric current, adapted to stabilize said alternating electric current voltage in a direct electric current voltage, and adapted to supply said at least one power supply battery of said at least one electrical device with said direct electric current voltage; and at least one nozzle which is engaged inside said at least one conduit upstream of said hub, wherein said at least one nozzle is adapted to convey said inlet fluid of said at least one conduit towards a portion of said hub comprised between two adjacent blades so that at least one portion of said hub is in fluid communication with said at least one conduit, wherein said at least one nozzle has a truncated-conical shape and comprises an inlet through opening and an outlet through opening, wherein said inlet through opening has substantially transverse dimensions equal to an internal cross section of said at least one conduit, wherein said transverse dimensions are measured on a transverse plane lying on a geometric plane perpendicular to a rotation axis (R) of said hub, wherein said outlet through opening of said nozzle has transverse dimensions equal to or less than an angular distance between two adjacent blades of said hub, and wherein said angular distance between two adjacent blades is measured on an arc of a geometric circumference passing through ends of said blades, in which the geometric circumference comprising the arc comprises a geometric centre that is geometrically coincident with a geometric centre of the hub.

2. The electric power supply kit according to claim 1, wherein said truncated-conical shape of said at least one nozzle is truncated by a geometric curve which forms said outlet through opening, wherein said geometric curve comprises a cross section that follows the profile of said geometric circumference that passes through the ends of said blades.

3. The electric power supply kit according to claim 1, wherein each blade of said hub comprises a cross section comprising a curvilinear portion comprising a concave portion directed to the direction opposite to a direction of rotation of said hub around said geometric rotation axis.

4. The electric power supply kit according to claim 1, wherein each blade of said hub comprising a convex portion directed to a same direction as the direction of rotation of said hub around said rotation axis.

5. The electric power supply kit according to claim 1, wherein said at least one nozzle comprises a curvilinear blockage portion which blocks at least one portion of a cross section of said outlet through opening of said at least one nozzle so as to narrow the opening of said outlet through opening.

6. The electric power supply kit according to claim 5, wherein said curvilinear blockage portion narrows the cross section of the outlet through opening so that said outlet through opening is open for a cross section between 33% and 66% wide with respect to an outlet through opening the transverse dimensions of which are equal to said angular distance between two adjacent blades of said hub.

7. The electric power supply kit according to claim 1, wherein axial dimensions of said outlet through opening correspond to a height of said blades of said hub, in which said height of the blades and the axial dimensions are measured along a geometric axis parallel to the rotation axis of the hub.

8. An irrigation system comprising:
said at least one conduit adapted for the passage of an irrigation fluid;
at least one electrical device comprising at least one rechargeable power supply battery; and
at least one electric power supply kit according to claim 1.

9. The irrigation system according to claim 8, further comprising a T-shaped conduit engaged in fluid communication with said at least one conduit and with said at least one hydroelectric turbine.

10. The irrigation system according to claim 8, further comprising at least one irrigation fluid dispenser, wherein said at least one hydroelectric turbine is mounted in fluid communication with said at least one irrigation fluid dispenser.

11. The irrigation system according to claim 8, wherein said at least one electrical device powered by said at least one rechargeable power supply battery comprises at least one selected from the group consisting of:
at least one solenoid valve, wherein said at least one solenoid valve is adapted to pass from at least an open position for allowing the passage of said irrigation fluid to at least one closed position for preventing the passage of said irrigation fluid;
at least one sensor adapted to measure at least one environmental observable;
at least one communication antenna adapted to transmit a WI-FI or 3G or radio communication signal;
at least one electronic control unit comprising at least one processor and at least one memory, wherein said at least one processor is adapted to control at least one from the group consisting of said at least one solenoid valve, said at least one sensor, and said at least one communication antenna; and
at least one WI-FI or 3G or radio router comprising at least one processor adapted to actuate said at least one communication antenna.

12. The irrigation system according to claim 8, wherein said at least one hydroelectric turbine is adapted to operate like a flow meter measuring a flow rate of irrigation fluid, wherein said hydroelectric turbine is connected in communication with at least one processor of said irrigation system configured to both receive said flow rate of irrigation fluid, and monitor and/or regulate said flow rate by actuating at least one solenoid valve, wherein said at least one solenoid valve is adapted to pass from an open position for allowing the passage of said irrigation fluid to at least a partially open position for reducing the flow rate of irrigation fluid, to a closed position for preventing the passage of said irrigation fluid.

13. The irrigation system according to claim 8, wherein said at least one electronic device is connected in communication with at least one processor of said irrigation system, wherein said at least one electronic device is configured for sending to said at least one processor a charge measurement of said at least one power supply battery to which said at least one electronic device is electrically connected and wherein said at least one processor is configured for controlling said charge measurement and for interrupting a charge of said at least one power supply battery of said at least one electronic device when said at least one power supply battery is charged at least within a predetermined threshold.

* * * * *